United States Patent [19]
Brody et al.

[11] Patent Number: 5,822,304
[45] Date of Patent: Oct. 13, 1998

[54] SCANNING FOR ACTIVE ATM VIRTUAL CHANNEL/VIRTUAL PATH IDENTIFIERS

[75] Inventors: Richard J. Brody, Clinton, Mass.; David Romano, Cumberland, R.I.

[73] Assignee: Hewlett-Packard Company, Palo Alto, Calif.

[21] Appl. No.: 620,774

[22] Filed: Mar. 22, 1996

[51] Int. Cl.[6] .................................................. H04J 3/14
[52] U.S. Cl. ...................... 370/248; 370/250; 370/399; 370/433
[58] Field of Search ........................... 370/60, 60.1, 94.1, 370/99, 13, 14, 85.7, 95.1, 241, 248, 252, 395, 397, 399, 409, 410, 433, 437, 450, 454, 465, 473, 250

[56] References Cited

U.S. PATENT DOCUMENTS

| | | | |
|---|---|---|---|
| 5,257,311 | 10/1993 | Naito et al. | 380/48 |
| 5,280,469 | 1/1994 | Taniguchi et al. | 370/13 |
| 5,313,453 | 5/1994 | Uchida et al. | 370/13 |
| 5,408,461 | 4/1995 | Uriu et al. | 370/14 |
| 5,434,846 | 7/1995 | Tremel et al. | 370/13 |
| 5,440,565 | 8/1995 | Miyamoto et al. | 371/20.4 |
| 5,442,702 | 8/1995 | Van Ooijen et al. | 380/23 |
| 5,457,700 | 10/1995 | Merchant | 371/27 |
| 5,481,536 | 1/1996 | Reisch et al. | 370/60.1 |

OTHER PUBLICATIONS

Sonet/ATM Networks & Testing Seminar Presentation, Cerjac Telecom Operation, A Division of Hewlett–Packard Company, Acton, MA, 1995.

*Primary Examiner*—Alpus H. Hsu
*Assistant Examiner*—Kwang Bin Yao

[57] ABSTRACT

An instrument and a method for identifying active channels in a communications system, especially a system operating according to the asynchronous transfer mode (ATM) protocol in which data cells are associated with virtual channels (VCs) and virtual paths (VPs). The instrument includes an ATM module with a VP/VC filter that permits capture of only those ATM cells corresponding to any selected set of VCs for a particular VP. The module also includes a processor that executes software that controls the VP/VC filter to scan through VP/VCs using a combination of slow and fast scan sequences such that channels with heavy traffic are identified quickly and channels with low bandwidth traffic are also identified, although not necessarily as quickly. To identify active VCs on a particular VP, the VP/VC filter is initially set to capture cells on all channels; as active channels are identified, those channels are disabled in the filter.

11 Claims, 4 Drawing Sheets

SCANNING FOR ACTIVE ATM VIRTUAL CHANNEL/VIRTUAL PATH IDENTIFIERS

FIELD OF THE INVENTION

The present invention relates to testing of communications circuits, especially circuits operating according to the asynchronous transfer mode protocol.

BACKGROUND

In high bandwidth communications systems such as those operating according to the asynchronous transfer mode (ATM) protocol, data being communicated is organized in small packages known as cells. In addition to the data that is the payload of a data-carrying cell, the cell includes a header. Because cells destined for many different end points are sent over a single physical communications circuit, the header of each payload-bearing cell includes a channel identifier, which is used to control the routing of the cell through the ATM system. When a cell is processed by an ATM switch, the channel identifier in a received cell determines where that cell is directed when it is transmitted from the switch (including determining what channel identifier the cell will have next, as a cell is likely to have a different channel identifier on each switch-to-switch leg of its journey). These channel identifiers include two parts: a virtual path identifier (VPI) and a virtual channel identifier (VCI). In a typical ATM system there are 256 possible VPIs and 65,536 possible VCIs; thus, there are 16,777,216 possible channel identifiers (VPI/VCIs).

When testing such systems, it is useful to be able to identify which channels are actively carrying cell traffic. Once active channels are identified, further analysis can be focused on these active channels.

The overall volume of traffic on an ATM circuit can be very large—typically too large an amount for a test system to continuously evaluate all of the traffic. Thus, test systems typically focus on a subset of the channels at any one point in time. However, focusing on a subset of the possible channels can make it difficult to identify the active channels quickly: the active channels are typically only a very small fraction of the millions of possible channels; further, accurately identifying all of the active channels is made more difficult when the traffic on some channels may be very low bandwidth (cells may be transmitted on such channels very infrequently) or may be bursty (having relatively long periods of inactivity between bursts of high data activity). A simple search that monitors each channel or group of channels for a period of time long enough to detect low bandwidth traffic can proceed for a relatively long time before any active channels are identified.

SUMMARY OF THE INVENTION

According to the present invention, active channels are identified by performing a combination of fast scans and slow scans. This permits rapid identification of high bandwidth channels, while still finding lower bandwidth channels over a more extended period of time. In addition, the pattern of scans is arranged to avoid setting up a pattern that could miss low bandwidth channels on which cells are transmitted at a low, regular rate.

A basic scan process used in the present invention includes (1) monitoring each VP to determine if any data is being communicated on the VP, and (2) for each VP on which data has been found, monitoring the data being communicated on that VP to identify specific active VCs.

When running this basic scan process, the period of time for which a VP is monitored for activity can be set to be long or short, and the period of time for which an active VP is monitored to identify active VCs can be set to be long or short.

The inventive system is controlled such that the basic scan process is run 32 times with short monitoring times, followed by a single run of the basic scan process with long monitoring times. This combination of 32 fast scans followed by a single slow scan is repeated as long as it is desired to continue scanning. The initial VP for each time through the basic scan process is changed for each basic scan.

A user of an instrument for testing ATM systems may want to know the VPI/VCI of an active channel—any active channel—in order to perform some test procedure; they may want this information quickly, without waiting for a comprehensive identification of active channels. In other situations, a user of the instrument may want a more comprehensive identification of channels, including channels that are active at very low data rates. The present invention satisfies both of these two different user requirements with a single approach to identifying active channels: channels with high data rates will be identified quickly (so, in the first situation, the user can quickly move on to further testing); on the other hand, over a longer time, the user can learn about low data rate channels as well.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION OF AN ILLUSTRATIVE EMBODIMENT

Many communications systems transport data in wide area networks according to a variety of standards, including those designed for electrical circuits (e.g., DS1, DS3, STS-1, STS-3) and those designed for optical circuits (e.g., OC-1, OC-3, OC-12). SONET refers to a collection of standards originally intended for optical communications (e.g., OC series), but later adapted for electrical communications (STS series). The specific examples listed here are widely used in North America; other parts of the world use standards that differ in detail, although the overall concepts relevant to the present invention are the same. ATM standards apply to higher levels of the communication standard hierarchy (i.e., ATM is physically transported by lower levels in the hierarchy, such as OC3).

Overall Instrument

The present invention will be described in detail in the context of an instrument for testing various characteristics of communications circuits, including characteristics relating to operation according to the ATM protocol. Such instrument receives and generates signals according to a variety of standards for data transport (e.g., DS series, OC series, STS series). Through the use of hardware and software options, the instrument can be configured with a variety of measurement capabilities. For example, various error rates and jitter measurements can be made. Various test patterns can be set, both for foreground data (data in a channel under analysis) as well as for background data (data in other channels).

The illustrative embodiment of the invention is created by adding new software to a prior art instrument (the CERJAC 156MTS SONET maintenance test set from Hewlett-Packard Company) to enable it to scan for active ATM channels.

Figure 1:
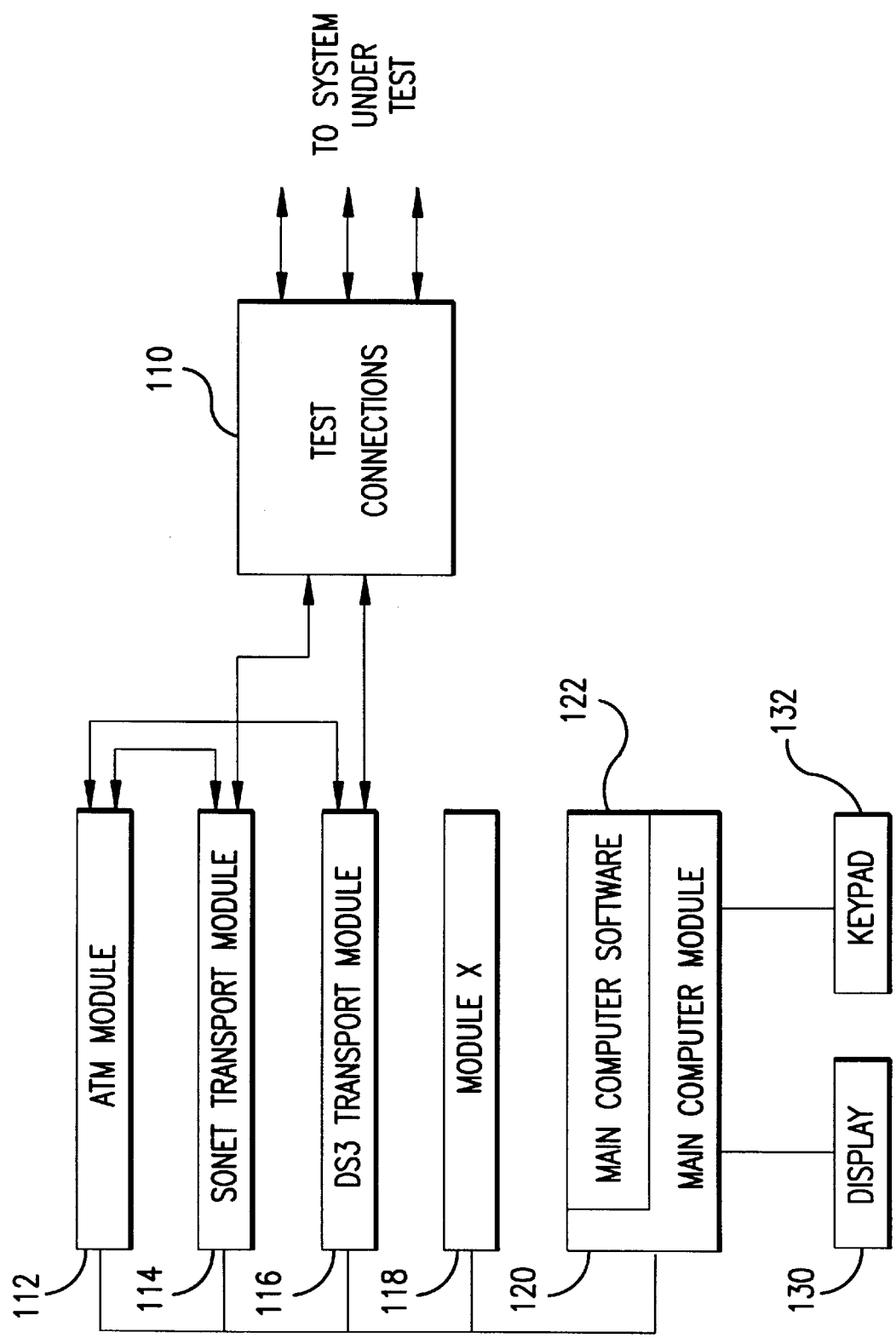
FIG. 1 is a block diagram of a communications test instrument embodying the present invention.

The instrument is organized as a collection of modules, some of which are optional and thus are only used in certain instrument configurations. FIG. 1 is a block diagram of the overall instrument. While the illustrative embodiment described in detail is a portable unit designed for field testing, the invention could be employed in bench or laboratory instruments having quite different basic configuration.

The front panel provides the primary mechanism by which a user of the instrument interacts with the instrument. The front panel includes a multi-line alphanumeric display 130 and a variety of buttons, referred to as the keypad 132. Some of the buttons have relatively fixed functions, while others have more general functions, such as for navigating menus of options that can be presented on the display 130. The display 130 is used both to present test results and to aid in controlling the instrument, such as by listing options that can be selected using the buttons of the keypad 132.

Overall instrument operation, especially the user interface, is controlled by a main computer module 120, which includes a general purpose processor (Motorola 68000) and software 122 executed by that processor. The main computer module 120 controls the display 130 and receives button-press information from the keypad 132. In addition, the main computer module 120 is connected to other modules 112, 114, 116, 118, so as to provide some control over such modules and to collect data from these modules. This data collected from the modules is further processed by the main computer module so as to present the user with information in a more useful form.

While in the illustrative embodiment the user interacts with the instrument through a front panel having buttons and a simple display, the invention could be used in other types of instruments, for example: the user interface could be based on a general purpose QWERTY keyboard and a graphical display; alternatively, buttons and display could be eliminated entirely from the instrument itself, such as in an instrument designed to be a component of a computer-controlled automated test system, in which case, the instrument receives control from and provides information to the system control computer and/or other parts of the automated test system.

The instrument receives signals through a variety of connectors, represented by the test connections block 110, which also converts optical signals to electrical signals.

The instrument can include a variety of modules 112, 114, 116, 118 for providing particular capabilities, such as a SONET transport module 114 or a DS3 transport module 116. The transport modules 114 and 116 provide the ability to receive signals according to the respective transport standards. Other modules 118 can be included to provide other specialized functions.

ATM Module

Figure 2:
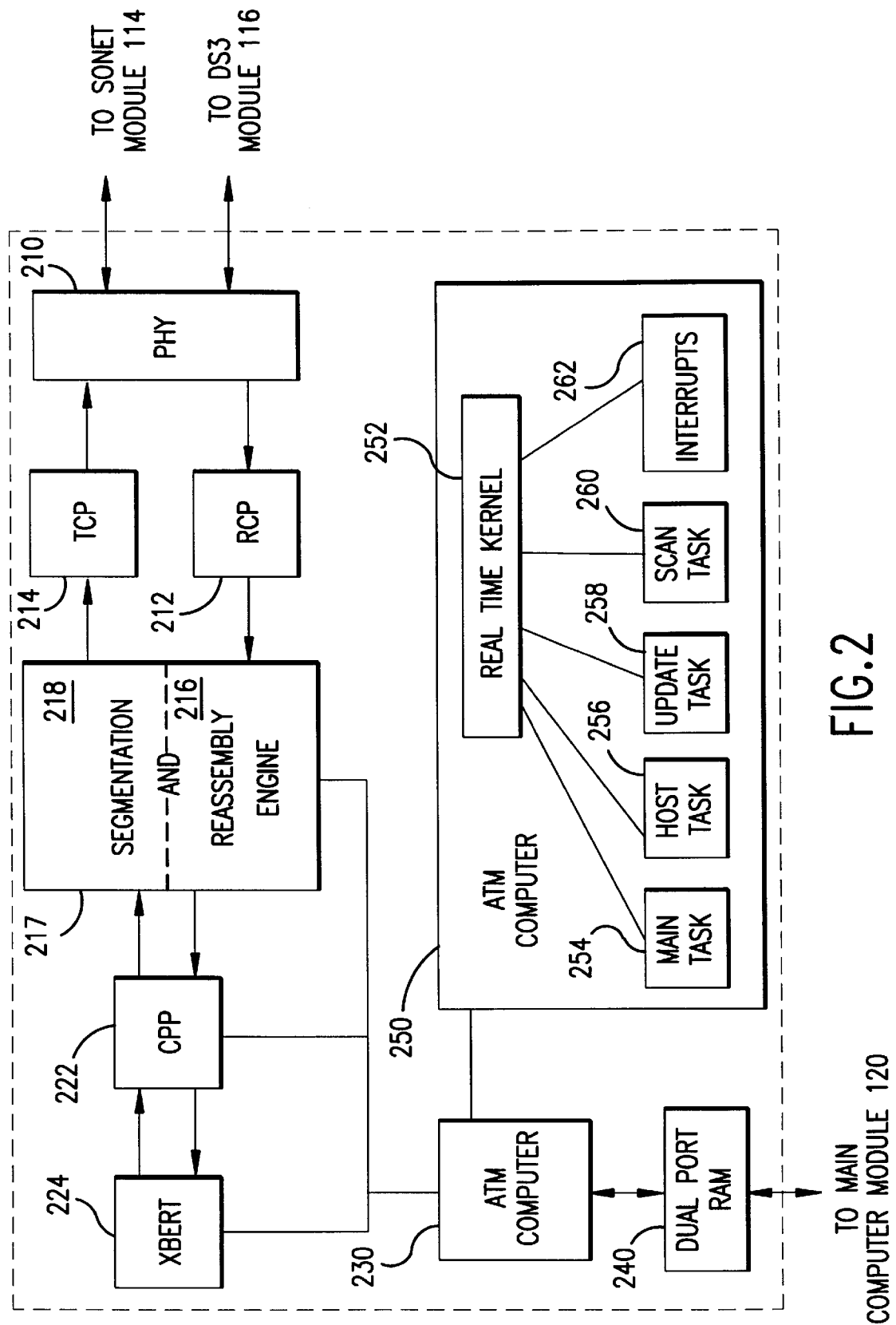
FIG. 2 is a block diagram of an ATM module of the communications test instrument, including a computer and software executed by that computer.

The instrument includes an ATM module 112 for providing ATM processing and measurement. FIG. 2 is a block diagram of the ATM module. The ATM module connects to the communications system under test via the transport modules 114, 116. The ATM module 112 also includes some physical layer interface logic 210 to handle certain aspects of the transport layer protocol; alternatively, the ATM module 112 could be designed to rely on the transport modules 114 and 116 for such circuitry.

The ATM module includes a receive cell processor 212, a transmit cell processor 214, an ATM segmentation/reassembly engine 217 (including an portions focused on segmentation 218 and on reassembly 216), a cell payload processor 222, a bit error rate generator/receiver 224, an ATM computer 230, ATM software 250 (stored in flash PROM), and a 2K by 16 bit dual port RAM 240.

The physical layer interface logic 210 receives signals in the form of DS3 or OC3 transport frames. This logic 210 extracts the ATM cells being carried by those frames and passes the cells on to the receive cell processor 212. In addition, this logic 210 can receive cells from the transmit cell processor 214; the physical layer interface logic 210 inserts these cells into the ATM traffic that is being carried by the DS3 or OC3 frames.

The receive cell processor 212 and the transmit cell processor 214 provide some format conversion between the physical layer interface logic 210 and the ATM segmentation/reassembly engine 217. In addition, these processors 212 and 214 provide access to the raw cell stream that is useful for certain types of testing (e.g., inserting errors in outgoing cells).

The ATM reassembly engine 216 can assemble ATM convergence layer cells (53 bytes each) into the packets or other units used by higher layers, such as the ATM adaptation layer or ATM service layer. The ATM segmentation engine 218 does the reverse operation: it creates ATM convergence layer cells from traffic in higher level protocols.

The cell payload processor 222 is used to process cells used for a constant bit rate service (CBR). The cell payload processor 222 receives ATM cells from the reassembly engine 216, extracts the payload portion of the ATM cells, and passes this data on to the bit error rate generator/receiver 224. Also, cell payload processor 222 receives data from the bit error rate generator/receiver 224, which it then incorporates into ATM cells that it passes to the ATM segmentation engine 218.

The bit error rate generator/receiver 224 can generate a data stream to be transmitted and then detect errors in that data stream when the stream is received back again.

The ATM computer 230 includes a processor (Motorola 68360), RAM, and other components typical of embedded computers. The ATM computer 230 executes the ATM software 250 to control operation of the ATM module 112 and to communicate with the main computer module 120.

The ATM computer 230 and the main computer module 120 can both access the dual port RAM 240 (which is in addition to RAM that is private to each of the ATM computer 230 and main computer module 120). These two computers 230, 120 use a mailbox protocol to communication through this dual port RAM 240. By this mechanism, test data (e.g., identified active VP/VCs) is passed to the main computer module 120, which presents the test data (or information derived from the test data) to the user on the display 130. In addition, control information is received from the main computer module 120 by this communication mechanism.

The ATM software 250 includes a real time multitasking kernel 252 that manages execution of interrupt handlers 262, a main task 254, a host task 256, an update task 258, and a scan task 260. The main task 254 handles errors and fault recovery. The host task 256 handles communication between the ATM module 112 and the main computer module 120 (the "host" computer). The update task 258 updates the ATM module 112 based on data received by the host task 256 from the main computer module 120.

The scan task 260 (illustrated in FIG. 4 and described in more detail below) is the portion of the ATM software primarily responsible for controlling the ATM module so that it scans for active ATM channels. The main computer module 120 directs the ATM computer 230 to proceed with scanning when the user has requested a scan for active ATM channels, such as by selecting an option from a menu on the display 130. Similarly, when the user indicates that scanning has proceeded long enough, the main computer module 120 directs the ATM computer 230 to end the scanning operation.

Figure 3:
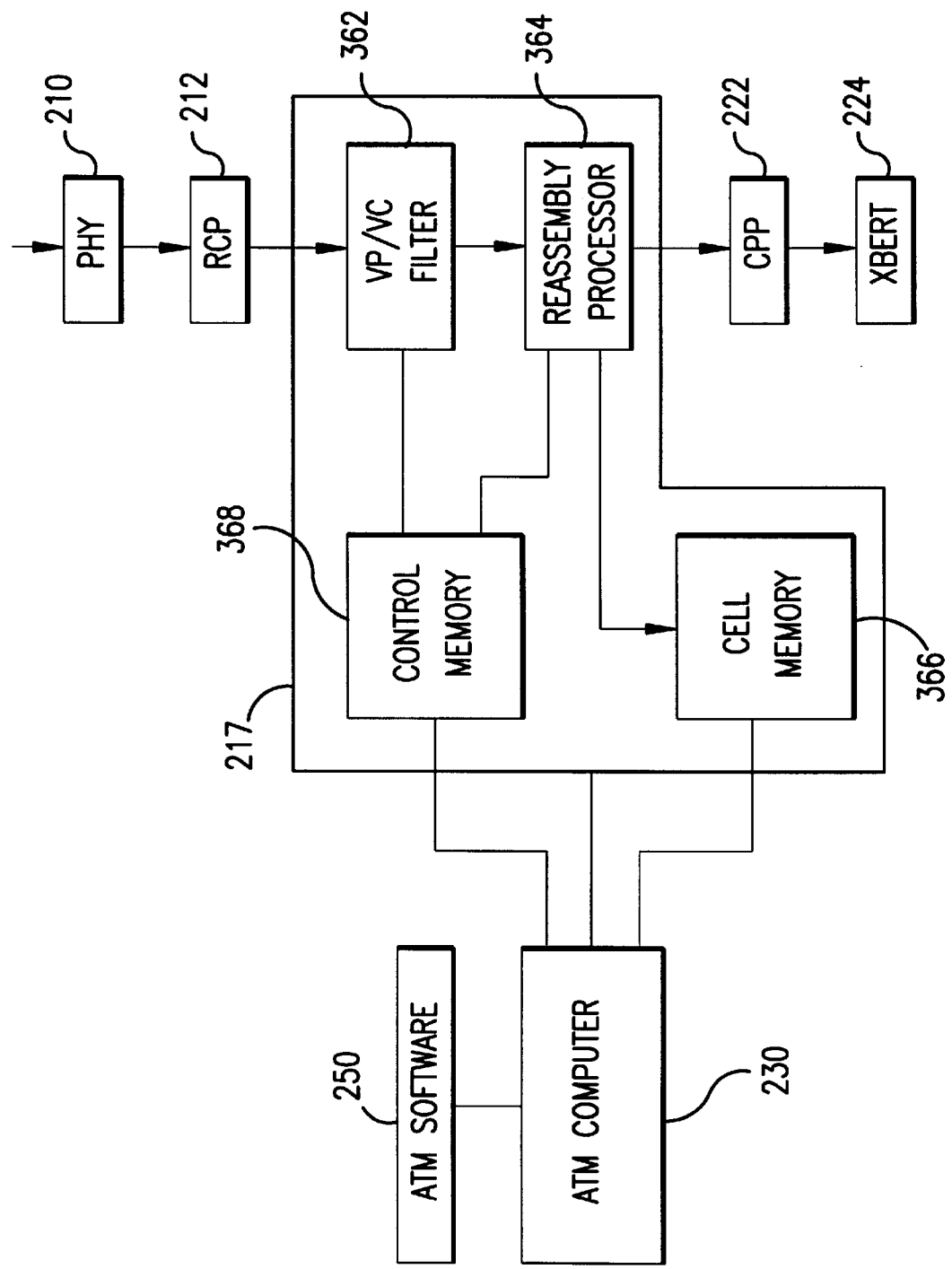
FIG. 3 is a block diagram illustrating control of ATM cell flow in the ATM module.

FIG. 3 illustrates control of the flow of received ATM cells in the ATM module 112, especially in the ATM segmentation/reassembly engine 217. The ATM segmentation/reassembly engine 217 includes a VP/VC filter 362, a reassembly processor 364, a cell memory 366, and a control memory 368.

Transport frames (e.g., OC3 or DS3) containing ATM cell traffic enter the ATM module though the physical layer interface logic 210, which extracts the ATM cells from the transport frames in which they are carried. This logic 210 then passes the ATM cells to the receive cell processor 212, which passes the cells to the VP/VC filter 362. The cells selected for capture by the VP/VC filter 362 (as controlled by the ATM software 250 via the control memory 368) are passed to the reassembly processor 364, which stores these selected cells in the cell memory 366 (128K bytes RAM). The cells contained in the cell memory 366 are available for processing by the ATM computer 230 and ATM software 250. The header of a cell stored in the cell memory 366 can be read by the ATM computer 230 to determine the cell's VPI/VCI.

The ATM computer exercises control over operation of the ATM segmentation/reassembly engine 217 both by accessing configuration registers in the engine 217 and by accessing a control memory 368 used by the ATM segmentation/reassembly engine 217. This control memory 368 includes a 16-bit storage location for each of the $2^{16}$ possible VCs for one VP. The value in each location in the control memory indicates whether cells for the VC corresponding to that location are to be selected for capture. In other words, the control memory 368 functions as a VC mask, indicating for which VCs cells are to be captured and for which VCs cells are to be discarded. The control memory also provides the capability to control where cells for each VC are stored in the cell memory; however, when the ATM module is scanning to identify active VP/VCs, cells are simply stored sequentially in that memory.

Scan Task

Figure 4:
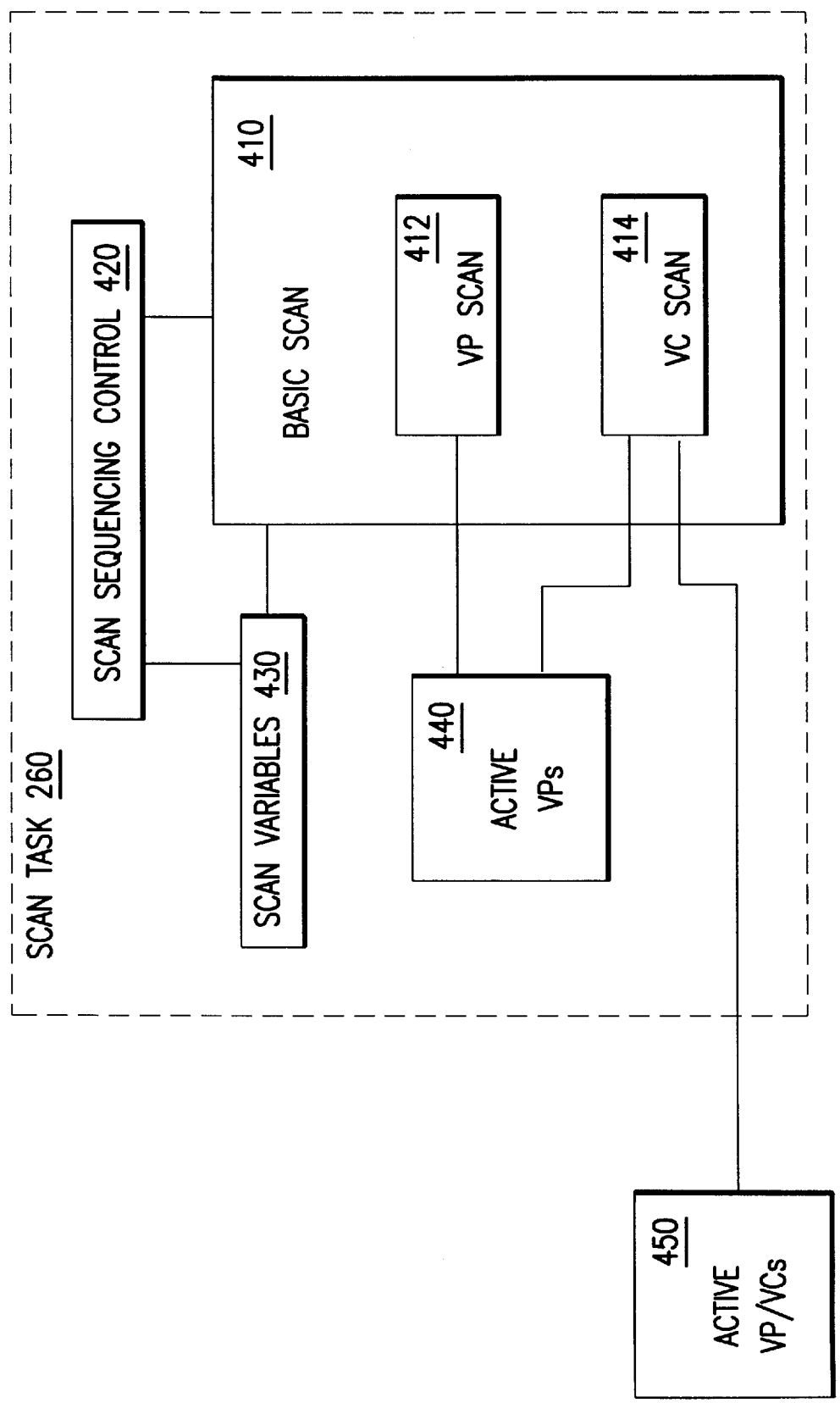
FIG. 4 is a block diagram illustrating relationships among portions of the software (both code and data structures) on the ATM module most directly involved in identifying active channels.

As illustrated in FIG. 4, a portion of the scan task 260 is software that performs a basic scan 410, which itself includes a VP scan 412 and a VC scan 414. Another portion of the scan task 260 is the scan sequencing control 420. There are various scan variables 430 that are used internally by the scan sequencing control 420 (such as a counter to keep track of the number of fast scans, so as to know when to initiate a slow scan) and used by scan sequencing control 420 to control operation of the basic scan 410 (such as the initial VP, VPwait, and VCwait).

The scan task 260 includes an array for storage of active VPs 440, and uses an array for storage of active VP/VCs 450. The array of active VPs 440 is used to communicate results of VP scan 412 to VC scan 414; it is a cumulative list of VPs on which activity has been detected. The scan task 260 stores its results in the array of active VP/VCs 450, which is the cumulative list of VP/VCs that have been found to be active; this array 450 is also accessed by the host task 256, to communicate these results to the main computer module 120.

The scan variables 430, the array of active VPs 440, and the array of active VP/VCs 450 are stored in RAM in the ATM computer 230. The first two are local to the scan task 260; the third is shared by the scan task 260 and other ATM software 250.

In the VP scan portion 412 of the basic scan 410, each VP is monitored, one at a time. The first VP in the scan is determined by the "initial VP" variable, one of the scan variables 430, as set by the scan sequencing control 420. The VPs are monitored in numerical order, starting with the VP identified by the initial VP variable. The logic used by the scan sequencing control increments (circularly) the initial VP variable each time the basic scan is performed. Proceeding through the VPs according to their numeric addresses is only a convenient way of ordering the VP scan, not a necessary way. What is important is that the VP scans be varied, so that ATM traffic that is periodic will not be missed by coinciding with periodicity in the VP scan process. While the illustrative embodiment creates variety in VP scans by having each successive VP scan start with a different VP, other schemes could be used. For example, the ordering of VPs in each VP scan could be a different random or pseudorandom sequence.

In the VP scan 412, each VP is monitored for a period of time (VPwait) during which time the VP/VC filter is set to capture all VCs for that VP. If any cells are captured, then that VP is added to a list of active VPs 440.

In the VC scan portion 414 of the basic scan 410, each VP in the list of active VPs 440 is monitored, one at a time. The monitoring of a particular VP starts with the VP/VC filter set to capture all VCs for that VP. If any cells are captured, then the VP/VC filter is set to exclude the VCs for the captured cells. Monitoring of the VP continues (capturing and masking out the VC for the captured cells) until a period of time (VCwait) passes without capturing any cells. The VPI/VCI for each captured cell is added to the list of active VP/VCs 450 (unless it is already in the list). The illustrative instrument limits this list to 40 VP/VCs. Various alternatives could be used in place of this limitation, such as the following: provision could be made for storing a longer list of active VP/VCs; older entries in the list could be overwritten as additional active VP/VCs are identified; or, all identified VP/VCs could be passed to the main computer module 120 without continuing to keep a list of all of them in the ATM module 112 (resulting in 'rediscovery' of previously identified active VP/VCs).

The scan sequencing control 420 causes the basic scan to be performed with a series of fast and slow scans. For a fast scan, VPwait and VCwait are set to VPshort and VCshort, respectively. For a slow scan, VPwait and VCwait are set to VPlong and VClong, respectively. A fast scan is faster than a slow scan because VPshort and VCshort are shorter times than VPlong and VClong, respectively. In the illustrative embodiment, VPshort has been measured to be about 3.3 milliseconds, VCshort has been measured to be about 430 milliseconds, VPlong has been measured to be about 140 milliseconds, and VClong has been measured to be about 805 milliseconds. Thus, a fast scan in a case where most VPs are inactive takes about 1 second, while a slow scan takes about one half minute.

As described above, VPwait is the period of time that the VP scan portion of the basic scan monitors a particular VP before moving on to the next VP to be monitored. Alternatively, time could be allocated in various other ways. For example, the VP scan could move on to the next VP as soon as any traffic has been detected, or move on if no traffic has been detected within a VPwait period of time. What is important is that fast scans allocate less time than long scans, not the specific way that time is allocated.

The scanning is controlled such that 32 fast scans are performed, followed by a slow scan, followed by 32 fast scans, followed by another slow scan, and so forth, until the user of the instrument does something that stops the scanning process or the maximum number of VP/VCs have been identified. The first VP in each set of 32 fast scans is one more than the VP used to start the first scan of the last set of 32; each fast scan within a set of 32 starts with the VP following the one used to start the previous fast scan (looping from 255 back to 0). Each slow scan starts with the VP that will be used as the starting VP for the first of the next set of 32 fast scans (thus, the slow scan starting point proceeds sequentially through the VPs).

The operation of the scan task is summarized in the following pseudocode:

```
Initialize the scan control variables for a fast scan
starting with VP = 0.
While (not done)
    Do basic scan.
    Update scan control variables.
End while loop.
```

The basic scan is summarized in the following pseudocode:

```
Set VC control memory to enable all VCs.
Set VP find counter to 0.
VP Scan: For each of the 256 VPs, starting with the VP set
for the next basic scan.
    Monitor the VP for a period of time (VPwait = VPshort
    or VPlong) (while waiting; do host check).
    If traffic is found, then add that VP to the list of
    active VPs, do pause check, and go on to the next VP.
Do host check.
Do pause check.
Initialize for capturing cells.
VC Scan: For each of the VPs in the list of active VPs.
    If traffic is found.
        Obtain the VPI/VCI from the cell header.
        If this VPI/VCI is not already in the list of active
        VPI/VCIs.
            If the list of active VPI/VCIs is full.
                Set done = YES to exit the outer while loop.
            Else.
                Add that VPI/VCI to the list of active VPI/VCIs
                (unless it is already on the list).
            Mask that VC from the list of VCs being monitored.
        Continue monitoring the other VCs on that VP.
Do host check.
Do pause check.
When no traffic is received on the remaining VCs for a
period of time (VCwait = VCshort or VClong), then reset
VC memory to trap on all VCs, do pause check, and move
on to the next VP in the list of active VPs.
```

The updating of scan control variables is summarized in the following pseudocode:

```
If (fast_ctr<32)
    If (slow) then increment (circularly) the VP on which
    the next group of 32 fast basic scans will start.
    VPwait = VPshort.
    VCwait = VCshort.
    Slow = NO.
    Increment fast_ctr.
    Increment (circularly) the VP on which the next basic
    scan will start.
Else.
    VPwait = VPlong.
    VCwait = VClong.
    Slow = YES.
    The VP on which the next basic scan will start = the
    starting point for the next group of 32 fast basic
    scans.
    Fast_ctr = 0.
```

The host check is summarized as follows: check to see if the main computer is trying to communicate with the ATM module; if it is, then do timeout.

The pause check is summarized as follows: if the user has indicated (such as by using the keypad 132) that the scan is to be paused or stopped (as communicated to the ATM module 112 by the main computer module 120), then wait (do timeout while waiting) until the scan is no longer to be paused or stopped (as communicated to the ATM module 112 by the main computer module 120), after which the loop variables are reset so that the scan process starts all over.

Timeout is summarized as follows: temporarily relinquish control to the other tasks running in the ATM computer. For example, this permits the host task to process communication with the main computer module 120.

Illustration of sequence of overall scan:

Scan (at the fast rate) all VPs 0–255 a total of 32 times (each time following up with a fast scan for specific active VCs on the VPs found to be active), rotating the starting point for each set of 256 VPs by 1 (i.e., 0–255, 1–0, 2–1, 3–2, . . . 31–30).

Scan (at the slow rate) all VPs 0–255 once, followed with a slow scan for specific active VCs on the VPs found to be active.

Scan (at the fast rate) all VPs 1, 2, 3–255,0 a total of 32 times (each time following up with a fast scan for specific active VCs on the VPs found to be active), rotating the starting point for each set of 256 VPs by 1 (i.e., 1–0, 2–1, 3–2, . . . 32–31).

Scan (at the slow rate) all VPs 1, 2, 3–255,0 once, followed with a slow scan for specific active VCs on the VPs found to be active.

And so forth.

As scanning proceeds, information about identified active VP/VCs is passed to the main computer module 120, which presents this information to the user of the instrument (e.g., via display 130), so the user can see the progress of the scanning operation. The instrument of the illustrative embodiment does not do further processing on these channels until the user ends the scanning operation; alternatively, an instrument could be arranged to perform testing of identified active channels in parallel with ongoing scanning for additional active channels.

The foregoing has described a specific embodiment of the invention. Additional variations will be apparent to those skilled in the art. Thus, the invention is not limited to the specific details and illustrative example shown and described in this specification. Rather, it is the object of the appended claims to cover all such variations and modifications as come within the true spirit and scope of the invention.

We claim:

1. A method for identifying active channels in a communications system in which cells of data being communicated are associated with channels and the channels are organized in groups of channels, the method comprising:

performing a fast scan in which a basic scan process is performed a plurality of times, each time starting with a different group of channels from those recently scanned;

performing a slow scan in which the basic scan process is performed once;

where the basic scan process includes the steps of checking to determine if data is being communicated on each group of channels, allocating a first period of time for each group of channels;

for each group of channels in which data has been found, monitoring the data being communicated on such group of channels to identify specific active channels, and storing a list of the active channels; and where the first period of time used in the fast scan is short compared to the first period of time used in the slow scan.

2. The method of claim 1 wherein the communications system operates according to the ATM protocol and the channels are ATM virtual channels (VCs) and the groups of channels are ATM virtual paths (VPs).

3. The method of claim 1 wherein the fast scan/slow scan combination is performed a plurality of times.

4. The method of claim 1 wherein the first period of time in the slow scan is more than four times as long as the first period of time in the fast scan.

5. The method of claim 1 wherein the first period of time in the slow scan is approximately 140 milliseconds and the first period of time in the fast scan is approximately 3.3 milliseconds.

6. The method of claim 1 wherein the monitoring to identify specific active channels continues on a particular group of channels until a second period of time has passed with no data being communicated on a channel that has not already been noted for that group of channels.

7. The method of claim 6 wherein the second period of time in the fast scan is approximately 430 milliseconds and the second period of time in the slow scan is approximately 805 milliseconds.

8. Apparatus for identifying active channels in a communications system in which cells of data being communicated are associated with channels (VCs) and the channels are organized in groups of virtual channels known as virtual paths (VPs), the apparatus comprising:

(A) a cell capture system for receiving data being communicated in the communications system and storing information relating to cells received on a specified VP, where the information stored includes identification of the corresponding VC for the cell;

(B) means for executing a VP scan in which the cell capture system is successively set to each VP for a VPwait period of time to determine whether there are any active channels within such VP;

(C) means for executing a VC scan in which the cell capture system is successively set to each VP that was determined to have an active channel, and the VC identifications stored by the cell capture system reviewed and identified as active channels, where the cell capture for each VP continues for at least a VCwait period of time;

(D) means for controlling execution of VP scans and VC scans and for controlling the values of VPwait such that a plurality of VP/VC scan combinations are executed, most combinations being executed with a VPwait that is less that one fourth as long as the VPwait for other VP/VC scan combinations.

9. The apparatus of claim 8 wherein the long VPwait is approximately 140 milliseconds and the short VPwait is approximately 3.3 milliseconds.

10. The apparatus of claim 8 in which the cell capture system includes:

a capture buffer, storage for a channel mask, and buffer control circuitry arranged such that cells associated with channels that are enabled in the mask are "captured", and cells associated with channels that are disabled in the mask are not "captured", where "capture" of a cell means storing data, including at least identification of the cell's associated channel, relating to the cell in the capture buffer;

and further comprising:

(E) a control system that reviews data in the capture buffer and, for each channel associated with a cell that has been captured, identifies such channel as active and sets the mask to disable such channel.

11. Apparatus for identifying active channels in a communications system in which cells of data being communicated are associated with channels, the apparatus comprising:

(A) a selective cell capture system connected to receive data from the communications system including, a capture buffer, storage for a channel mask, and buffer control circuitry arranged such that cells associated with channels that are enabled in the mask are "captured", and cells associated with channels that are disabled in the mask are not "captured", where "capture" of a cell means storing data, including at least identification of the cell's associated channel, relating to the cell in the capture buffer; and (B) a control system that views data in the capture buffer and, for each channel associated with a cell that has been captured, identifies such channel as active and sets the mask to disable such channel.

* * * * *